United States Patent Office 3,192,955
Patented July 6, 1965

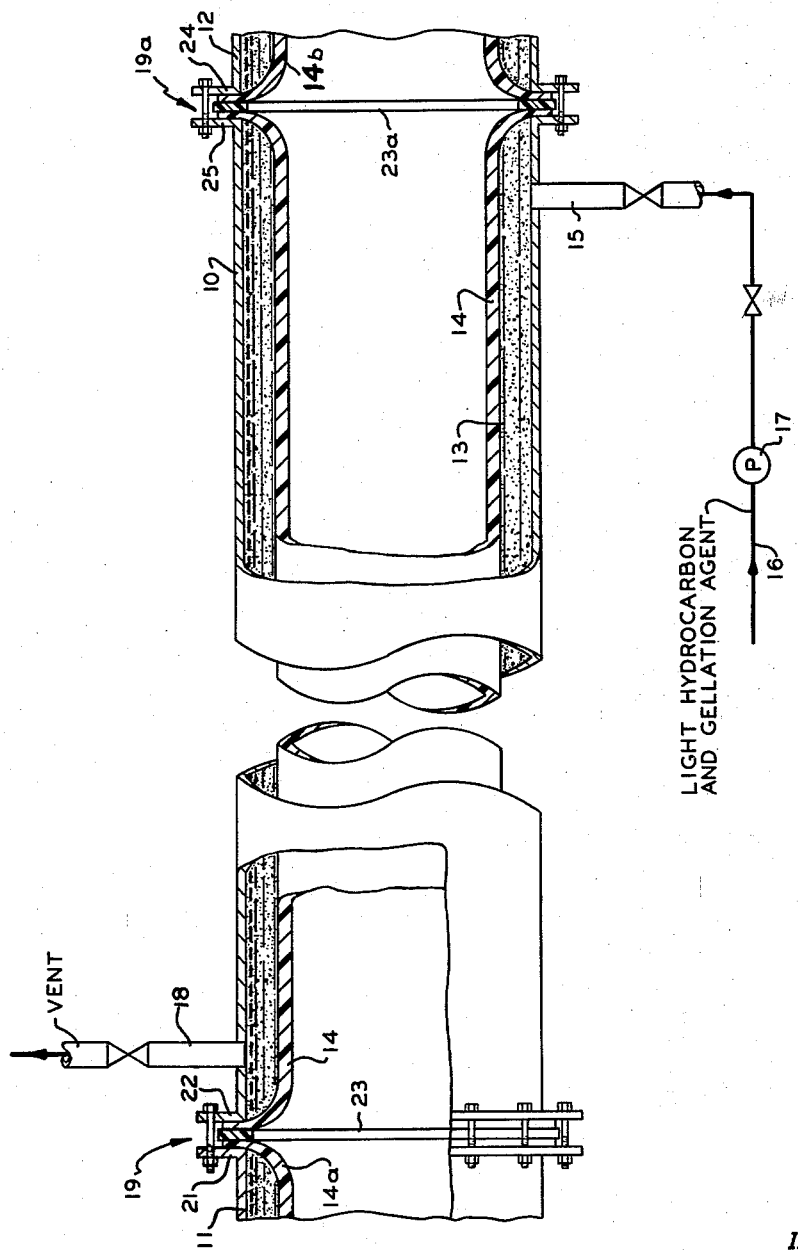

3,192,955
REINFORCED CORROSION RESISTANT CONDUIT
William B. Buck and Gearld I. Freeze, Oklahoma City, Okla., assignors to Phillips Petroleum Company, a corporation of Delaware
Filed Apr. 14, 1961, Ser. No. 103,089
6 Claims. (Cl. 138—140)

This invention relates to corrosion resistant conduits. In one aspect the invention relates to corrosion resistant conduit systems for use in high pressure service. In another aspect this invention relates to a method for providing a corrosion resistant liner for a high pressure pipe so that the internal pressure is exerted upon the pipe rather than upon the corrosion resistant liner.

For many years pipes and other conduits have been lined with hydraulic cement and such cement lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes ocur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported cement lined steel pipe has been found to be very little better than unlined steel pipe. Such bacteria have been found beneath the cement lining of cement lined pipe; however, if the cement lining allows the fluids being transported to come in contact with the metal pipe, corrosion can result in galvanic action or chemical action in addition to attack by bacteria.

Resinous or plastic materials such as polyvinylchloride, solid polyolefins, nylon, natural and synthetic rubber, and the like, have been proposed for use in conduits transporting corrosive fluids; however, such materials lack the tensile strength required for high pressure service and therefore the use of such materials has been limited.

It is a principal object of this invention to provide an impermeable, corrosion resistant liner for conduits so that the liner is not dependent upon the tensile strength of the liner to withstand the internal pressure applied to the conduit. Another object of the invention is to provide a conduit assembly having therein a resinous liner wherein the annulus between the conduit and the liner is substantially filled with a gel. Still another object of the invention is to provide a method for securing a resinous liner within a conduit and for filling the annulus between the conduits with a liquid and a gelatinizing agent which will cause the liquid to become a gel. Other and further objects and advantages will become evident to one skilled in the art upon study of this disclosure, including the detailed description of the invention and the drawing wherein:

The sole figure of the drawing is a schematic illustration, partly in section, of a preferred embodiment of the invention.

Referring now to the drawing a section of conduit 10, representing a portion of a pipe line represented by conduits 10, 11 and 12, is shown with the annulus 13 between the conduit 10 and the resinous inner pipe 14 being filled with the mixture of a liquid such as, for example, a liquid hydrocarbon and a gelatinizing or gelation agent introduced via conduit 15. The mixture of liquid hydrocarbon and gelation agent is supplied from a source (not shown) via conduit 16 and pump 17 to the conduit 15. Air or other vapor is displaced from the annulus 13 and vented through conduit 18. If a fluid heavier than the liquid hydrocarbon is to be displaced from the annulus 13, the mixture of liquid hydrocarbon and gelation agent will be introduced via conduit 18 and the heavier fluid will be displaced through conduit 15. The sections of conduits 11 and 12 are shown with the annulus already filled with liquid hydrocarbon and gelation agent.

The resinous pipe 14 can be secured to the conduit 10 by cementing, riveting and other conventional means. As illustrated in the drawing, the resinous liner 14 is secured to the conduit by means of the bolted flange connections 19 and 19a. Thus, the ends of resinous liners 14 and 14a are secured between the flange members 21 and 22 of bolted flange 19. A gasket 23 can be employed if desired. The ends of liners 14 and 14b are similarly secured between the flange members 24 and 25 of bolted flange 19a. A gasket 23a can be employed if desired.

Sections of lined pipe or conduit can be joined together or joined to fittings or to vessels by any desired means including the flanged connections illustrated. Threaded connections can be made employing a resinous insert pressed into the coupling member so that the resinous insert of the coupling will be pressure sealed to the ends of the resinous liners of the pipe when sections of lined pipe are threaded into the coupling. Welded connections can also be made, particularly if the gel-filled annulus is of the proper thickness to effect a weld between the joined ends of the resinous pipe as a result of the heat derived from welding the outer metal pipe.

The resinous pipe which provides the impermeable, corrosion resistant liner can be any impermeable, substantially rigid resinous material such as the so-called organic plastics including solid polymers of olefins, nylon, polyvinylchloride, and the like; and mixtures thereof. A particularly preferred class of materials for making the resinous pipe of this invention is the class of solid linear polymers of 1-olefins, particularly linear solid polyethylene and solid copolymers of ethylene and higher olefins such as propylene, 1-butene and the like, prepared by the low pressure polymerization of ethylene or copolymerization of ethylene and a higher molecular weight olefin in the presence of an organic diluent and a solid catalyst. Such polyethylene and copolymers can be prepared by the method described in U.S. Patent 2,825,721, issued March 4, 1958 to J. P. Hogan et al.

The hydrocarbon gel which can be used to occupy the annulus between the inner resinous liner and the outer metal conduit can be any liquid hydrocarbon which can be gelled by the conventional gelation agents which are commercially available. Specific liquid hydrocarbons include gasoline, kerosene, and other high-boiling liquid hydrocarbons including crude oil. The gelation agents include a hydrocarbon-soluble acrylic resin, preferably a salt-forming hydrocarbon-soluble acrylic resin, and with an aqueous alkylene material such as described in U.S. Patent 2,443,378, issued June 15, 1948; and soap mixtures referred to as "Napalm." Such soaps can comprise a mixture of aluminum soap of coconut oil acid, aluminum naphthenate and aluminum oleate. Other soaps of fatty acids of 10–20 hydrocarbon atoms per molecule are applicable and other metal ions can be utilized including calcium, barium, strontium and lithium. The physical properties of the gels can vary from soft gels such as petroleum jelly to hard gels such as "canned heat."

The density of the hydrocarbon gels does not differ greatly from that of the resinous pipe liner and therefore the liner does not have a tendency to sink or to float in the hydrocarbon liquid occupying the annulus particularly if the interior of the resinous liner is substantially filled with a hydrocarbon fluid prior to gelation of the hydrocarbon fluid in the annulus. The liquid hydrocarbon can be added to the interior of the resinous lining before, during or after filling the annulus with the mixture of liquid hydrocarbon and gelation agent, preferably prior to gelation of the hydrocarbon in the annulus. The density of the mixture of liquid hydrocarbon and gelation agent will generally be within about 25 percent of the density of the resinous pipe.

Materials suitable for gelatinization of water or aqueous solutions include heavy metal lignosulfonates such as chromium and barium lignosulfonates; animal gelatine, vegetable gelatin (agar-agar), bentonite, dibenzoyl cystine and the like. Such materials are available commercially such as the product marketed by the Halliburton Oil Well Cementing Company under the name of Hydro-Lok (PWG). The aqueous solution of the gelatinizing material should exhibit low viscosity properties and should set up to a stiff but not hard gel. One weight percent or less of dibenzoyl cystine will gel fresh or salt water. A sufficiently stiff gel can be produced by about 0.1 to about 0.5 weight percent of dibenzoyl cystine in fresh water after a few hours at room temperature and the viscosity of the water is not noticeably increased prior to the gelatinizing action.

Although it is not essential that the resinous pipe be centered in the reinforcing conduit, it is desirable as an aid in the prevention of air pockets occurring during placement of the mixture of liquid hydrocarbon and gelation agent.

The invention can be applied to short sections of pipe before the pipe is installed; however, it is usually preferred to install the resinous pipe liner in sections of steel pipe as conduit in lengths up to about 1,000 to about 3,000 feet or even more and then to add the liquid containing the gelation agent to such installation. It is a feature of the invention that the relatively low viscosity of the liquid prior to becoming a gel permits filling the annulus of long sections of conduit with relatively low pumping pressures which will avoid the danger of causing collapse of the resinous liner.

When it is necessary to cut through a conduit having therein a resinous liner with a gelled liquid occupying the annulus there between, the gelled substance will not flow from the annulus. There is no tendency for the gel to be pumped, by pressure pulses, through a leak which might develop in the outer conduit as would be in the case if a fluid occupied the annulus.

Reasonable variations and modifications are possible within the scope of this disclosure without departing from the spirit and scope of the invention.

That which is claimed is:

1. A corrosion resistant pipe assembly comprising a pressure resistant steel pipe, susceptible of corrosion; a corrosion resistant, rigid, resinous pipe consisting essentially of a solid polymer of an olefin positioned in said pressure resistant pipe so as to provide an annulus between said pipes; and a gelled liquid substantially completely filling said annulus.

2. A corrosion resistant and pressure resistant pipe line assembly comprising sections of steel pipe connected together to form a pipe line; sections of resinous pipe positioned in said pipe line so as to provide an annulus beteen a section of resinous pipe and steel pipe and secured to said steel pipe so as to prevent communication of fluid in the resinous pipe with the steel pipe and with the annulus; and a gel substantially filling said annulus between a section of resinous pipe and a section of said steel pipe.

3. The assembly of claim 2 wherein the resinous pipe is a solid polymer of an olefin.

4. The assembly of claim 2 wherein the resinous pipe is solid polyethylene.

5. The assembly of claim 2 wherein the resinous pipe is a solid copolymer of ethylene and a higher molecular weight olefin.

6. The assembly of claim 5 where the higher molecular weight olefin is propylene.

References Cited by the Examiner

UNITED STATES PATENTS

| | | | |
|---|---|---|---|
| 424,057 | 3/90 | Gilman | 138—111 |
| 469,469 | 2/92 | Greenfield | 138—149 X |
| 497,535 | 5/93 | Cummings | 138—149 X |
| 2,053,122 | 9/36 | Schnabel | 138—137 |
| 2,478,326 | 8/49 | Scarth | 138—148 XR |
| 2,874,548 | 2/59 | Drushel et al. | 138—149 XR |
| 2,918,394 | 12/59 | Smith | 138—137 XR |
| 2,982,311 | 5/61 | Haskell | 138—148 XR |
| 3,071,162 | 1/63 | Mick | 138—118 X |

FOREIGN PATENTS

| | | |
|---|---|---|
| 919,113 | 2/47 | France. |
| 123,284 | 1901 | Germany. |

EDWARD V. BENHAM, *Primary Examiner*.